United States Patent
Lantz

(10) Patent No.: US 6,733,384 B2
(45) Date of Patent: May 11, 2004

(54) CREATING A CUTTING TEMPLATE FOR A VIRTUAL JIGSAW PUZZLE USING GUIDE POINTS AND A SPLINE-FITTING ALGORITHM

(75) Inventor: Philip R. Lantz, Cornelius, OR (US)

(73) Assignee: Intel Corporation, Santa Clara, CA (US)

(*) Notice: Subject to any disclaimer, the term of this patent is extended or adjusted under 35 U.S.C. 154(b) by 247 days.

(21) Appl. No.: 09/948,298

(22) Filed: Sep. 6, 2001

(65) Prior Publication Data

US 2003/0045335 A1 Mar. 6, 2003

(51) Int. Cl.⁷ ............................................. A63F 9/24
(52) U.S. Cl. ....................................... 463/9; 273/153 R
(58) Field of Search ............................... 463/9, 22, 42, 463/43, 47; 345/440, 441, 442, 443; 273/157 R, 153 R, 156, 160

(56) References Cited

U.S. PATENT DOCUMENTS

| | | | | |
|---|---|---|---|---|
| 5,230,508 A | * | 7/1993 | Tabler | 273/157 R |
| 5,237,649 A | * | 8/1993 | Yamada | 345/442 |
| 5,865,928 A | * | 2/1999 | Lariviere et al. | 156/256 |
| 6,029,173 A | * | 2/2000 | Meek et al. | 707/102 |

* cited by examiner

*Primary Examiner*—Kim Nguyen
(74) *Attorney, Agent, or Firm*—Blakely, Sokoloff, Taylor & Zafman LLP

(57) ABSTRACT

Creation of a cutting template for a virtual jigsaw puzzle using guide points and a spline-fitting algorithm is described. Guide points that define geometric parameters of a piece of a virtual jigsaw puzzle are selected. A curve is fit to the guide points using a spline-fitting algorithm to define a shape of the puzzle piece.

27 Claims, 11 Drawing Sheets

CREATING A CUTTING TEMPLATE FOR A VIRTUAL JIGSAW PUZZLE USING GUIDE POINTS AND A SPLINE-FITTING ALGORITHM

FIELD OF THE INVENTION

The invention relates to virtual jigsaw puzzle generation. Particularly, the invention relates to generation of sophisticated virtual jigsaw puzzles.

BACKGROUND

The jigsaw puzzle is an engaging form of home entertainment that has existed for generations. With the advent of computer age, many traditionally physical games such as various types of "board" games have been simulated and brought into the virtual realm. In a limited sense, jigsaw puzzles are no exception.

Existing virtual jigsaw puzzle simulators, however, can produce only very basic puzzle styles. For example, all of the pieces of the puzzle might be virtually the same, with the exception of the portions of the pieces that are contiguous to an outer edge of the puzzle. Some simulators introduce some variation to the pieces by changing the size or curvature of one or more knobs of each piece. However, even with such variations introduced, the puzzles generated are still very similar to one another.

Puzzle shapes may also be manually drawn, in an attempt to create different and more complicated styles of virtual puzzles. However, this approach is very labor intensive and requires large amounts of computer memory to store and transmit information used to recreate the puzzle.

DETAILED DESCRIPTION

Creation of a cutting template for a virtual jigsaw puzzle using guide points and a spline-fitting algorithm is described. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

Guide points that define geometric parameters of a piece of a virtual jigsaw puzzle are selected. A curve is fit to the guide points using a spline-fitting algorithm to define a shape of the puzzle piece. Because the puzzle pieces may be created by a computer system, the number of different types of cutting templates that may be created is virtually limitless, without requiring the labor of creating puzzle templates by hand. The use of guide points and a spline-fitting algorithm may generate more complicated puzzle designs than would be generated by current computerized methods. Additionally, creating the virtual puzzle by the present invention allows for storage and transmission of information needed to recreate the cutting template using much less memory than would be required for a hand-drawn virtual puzzle cutting template.

The term "virtual" means simulated by electronic technology, such as a digital processing system, as described below with reference to FIGS. 8 and 9. A digital processing system is an electronic device that has the ability to store, retrieve, and process data. The term "digital processing system" will be used interchangeably with the term "computer system."

It will be appreciated that the invention describes the creation of virtual jigsaw puzzles but the invention is not so limited. The creation of a physical jigsaw puzzle using the output from the creation of a virtual jigsaw puzzle is also contemplated. The terms "virtual jigsaw puzzle", "jigsaw puzzle", and "puzzle" are used interchangeably.

Figure 1:
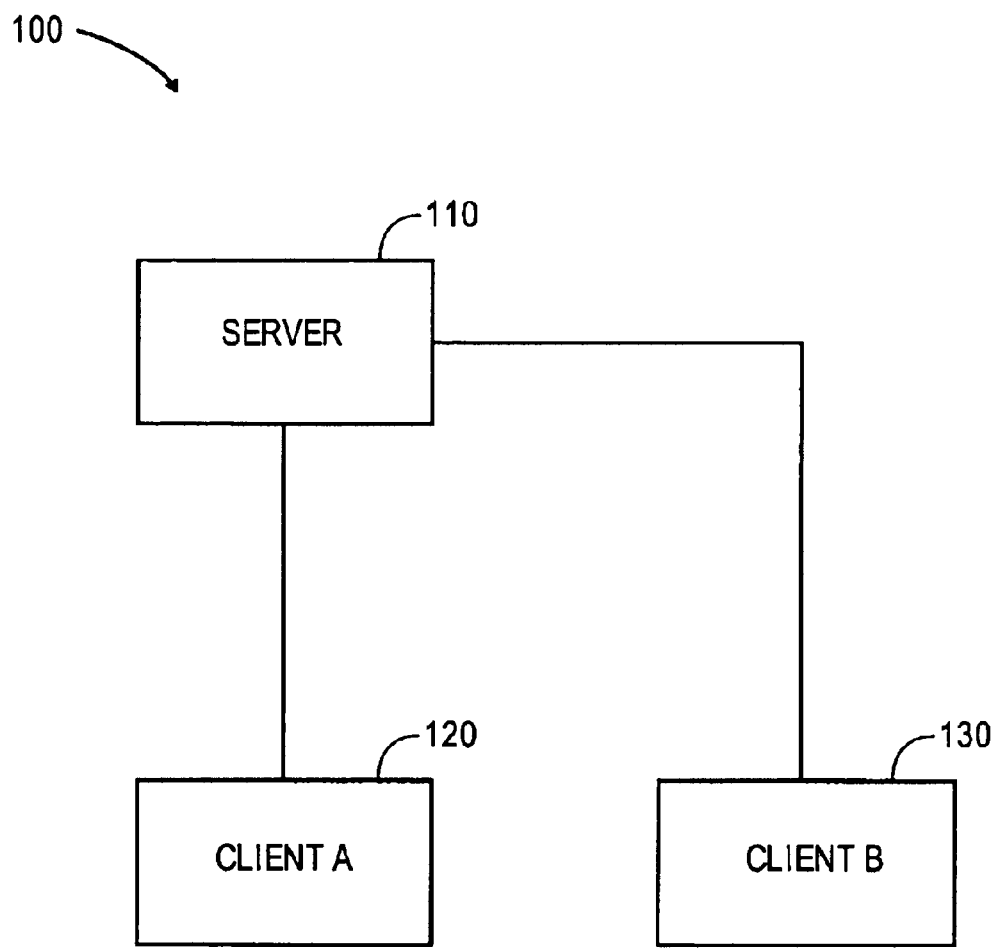
FIG. 1 is a diagram of a system-level overview of an embodiment of the invention.

FIG. 1 is a diagram of a system-level overview of an embodiment of the invention. Server 110 is communicatively coupled to client computer A 120 and client computer B 130. In one embodiment, client computer A 120 receives a user preference input and uses the input to create a virtual jigsaw puzzle. In another embodiment, the virtual jigsaw puzzle is communicated to another computer, such as for example client computer B 130, by transferring the parameters that were used to control the process of creating the puzzle via server 110. Client computer B may then recreate the virtual jigsaw puzzle. In another embodiment, a client computer, such as for example client computer A 120 receives a user preference from a user and communicates it to server 110. Server 110 uses the user preference to create a virtual jigsaw puzzle. Server 110 may then communicate the puzzle or parameters to create the puzzle to client computers. The puzzle creation process may be carried out in a single computer or server environment.

The virtual jigsaw puzzle is created by selecting guide points that define geometric parameters of a piece of jigsaw puzzle and fitting a curve to the guide points using a spline-fitting algorithm to define the shape of a piece. User preferences, such as the user preference and the second user preference discussed above may include a degree of random variation in the selecting of the guide points, a total number of pieces of the jigsaw puzzle, a degree of random variation of the shape of the piece, or a degree of random variation of a shape of the knob of a piece, but the invention is not so limited.

Figure 2:
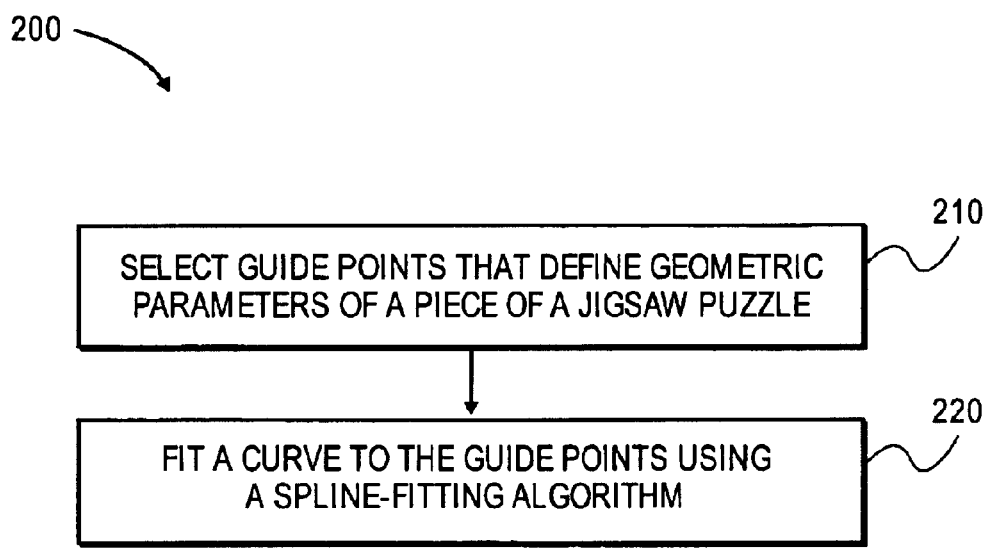
FIG. 2 is a flow diagram of a method to be performed by a computer according to an embodiment of the present invention, such as the embodiment illustrated in FIG. 1.

FIG. 2 is a flow diagram of a method to be performed by a computer according to an embodiment of the present invention, such as the embodiment illustrated in FIG. 1. At block 210, guide points that define geometric parameters of a piece of a jigsaw puzzle are selected. At block 220 a curve is fit to the guide points using a spline-fitting algorithm. In one embodiment, the selecting of the guide points is performed for the piece of the puzzle as well as an adjacent piece of the puzzle. In another embodiment, the selecting of the guide points is performed for a contiguous group of pieces. In yet another embodiment, the fitting of the curve is performed for the piece and an adjacent piece of the puzzle. In still another embodiment, the fitting of the curve is performed for a contiguous group of pieces. In still another embodiment, the selecting of the guide points and the fitting of the curve are performed for an entire edge of a puzzle piece. In still another embodiment, the selecting of the guide points and fitting of the curve performed collectively for a common edge of a contiguous group of pieces. Performing these steps collectively for a common edge can ensure continuity between the common edge of the contiguous group of pieces.

Figure 3A:
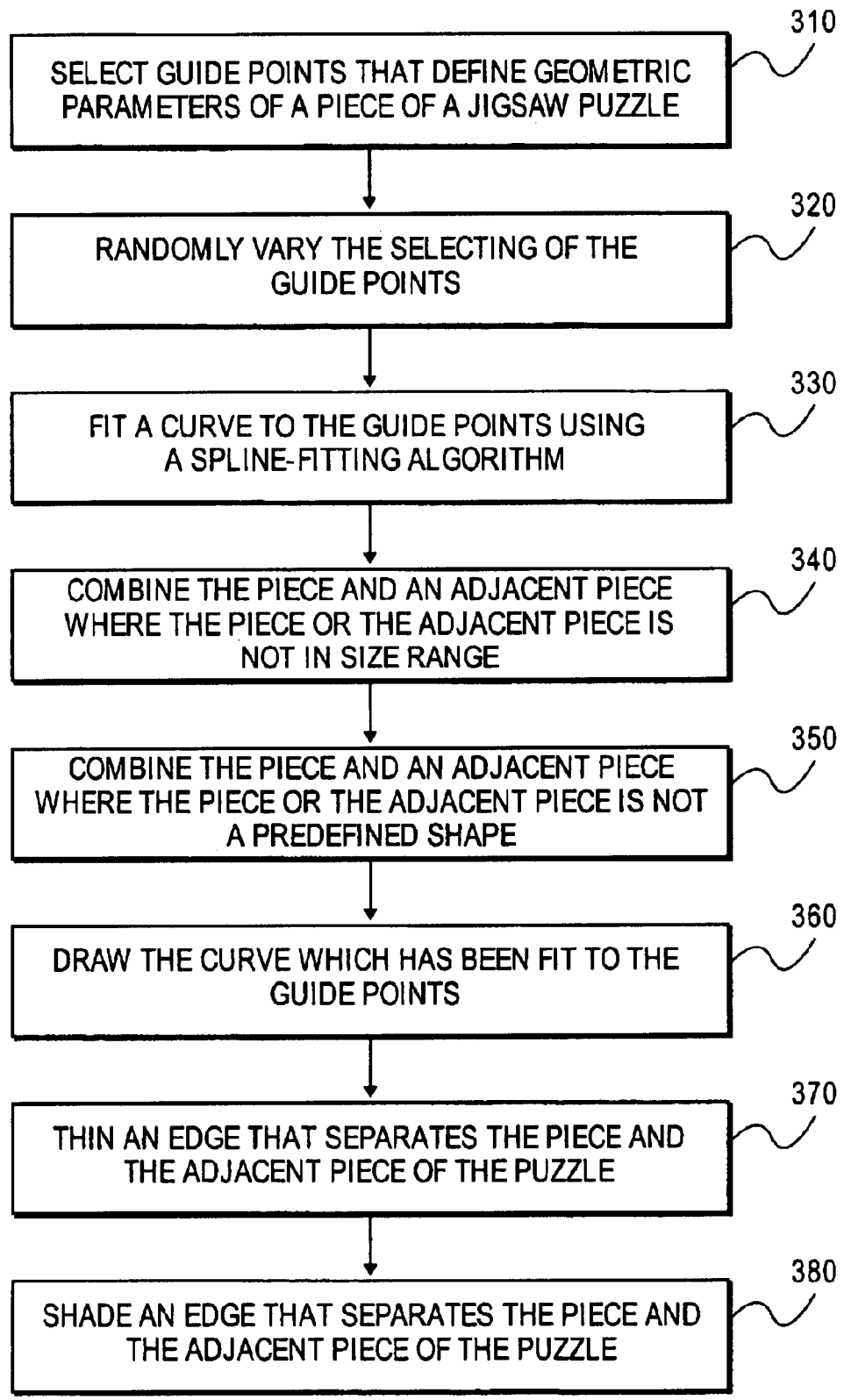
FIGS. 3A–C are flow diagrams of alternate methods to be performed by a computer according to an embodiment of the present invention, such as the embodiment illustrated in FIG. 1.
Figure 3B:
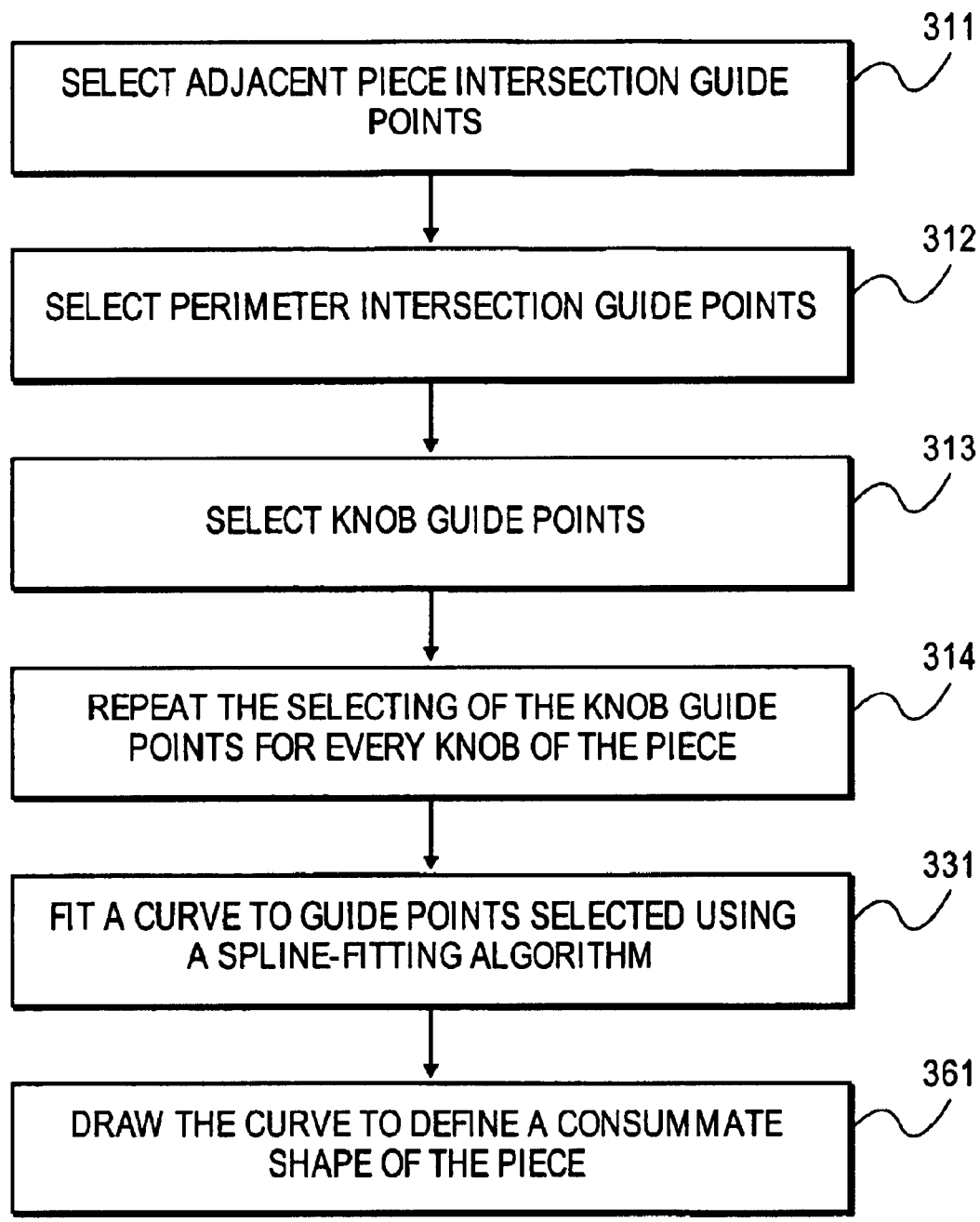
Figure 3C:
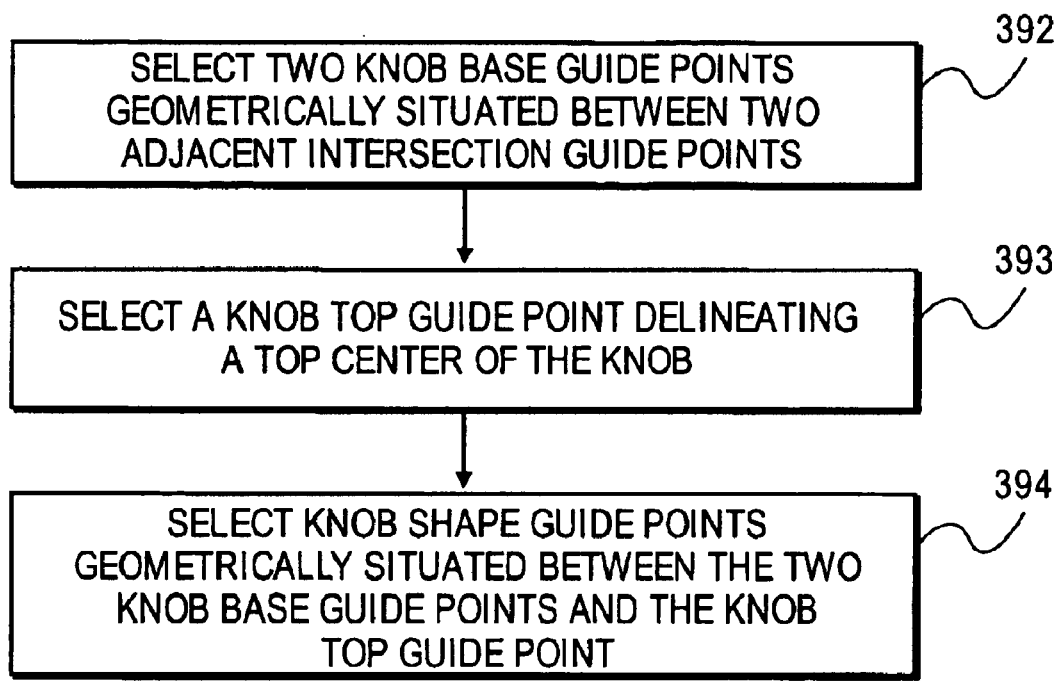

FIGS. 3A–C are flow diagrams of alternate methods to be performed by a computer according to an embodiment of the present invention, such as the embodiment illustrated in FIG. 1.

In block 310 of FIG. 3A, guide points are selected that define geometric parameters of a piece of a jigsaw puzzle. The selection may or may not be similar to that of block 210. At block 320, the selecting of the guide points is randomly varied. In one embodiment, the random variation is introduced by a pseudo-random number generator. By using a pseudo-random number generator, a set of guide points may be reproduced by saving the seed of the pseudo-random number generator, instead of saving the location of all of the guide points. In another embodiment, a degree of random variation is determined by a user preference. At block 330, a curve is fit to the guide points using a spline-fitting algorithm to define a shape of the piece. The fitting may or may not be similar to that of block 220. At block 340, the piece is combined with an adjacent piece of the jigsaw puzzle where the piece or the adjacent piece is not within a pre-defined size range. At block 350, the piece is combined with an adjacent piece of the jigsaw puzzle where the piece or the adjacent piece is not within a pre-defined shape categorization. At block 360, the curve that has been fit to the guide points is drawn. At block 370, an edge that separates the piece and an adjacent of the jigsaw puzzle is thinned. At block 380, an edge that separates the piece and an adjacent piece of the jigsaw puzzle is shaded. In an alternate embodiment, instructions for the drawing of the curve are communicated to a cutting device. The cutting device may be a laser cutter, a saw or other type of cutter. The instructions may be suitable to control the cutting device to cut a physical jigsaw puzzle piece according to the drawing.

At block 311 of FIG. 3B, adjacent piece intersection guide points that define geometric locations where a corner of a piece of a jigsaw puzzle intersects with a corner of an adjacent piece of the jigsaw puzzle are selected. At block 312, perimeter intersection guide points that define the geometric locations where a corner of the piece of the jigsaw puzzle intersects with an outer perimeter of the jigsaw puzzle are selected, if the piece is geometrically contiguous to the perimeter of the jigsaw puzzle. At block 313, knob guide points that define a geometric shape of a knob of a piece of a jigsaw puzzle and define a size of the knob relative to the size of the piece of the jigsaw puzzle are selected. At block 314, the selecting of the knob guide points is repeated for every knob of the piece. At block 331, a curve is fit to the adjacent piece intersection guide points, the perimeter intersection guide points and the knob guide points using a spline-fitting algorithm. At block 361, the curve is drawn to define a consummate shape of the piece.

In one embodiment, blocks 311, 312, 313, 314, 331 and/or 361 are also performed for the adjacent piece of the jigsaw puzzle. The blocks may be performed separately for each edge of a single puzzle piece. In another embodiment, these blocks may be performed collectively for the common edge of a contiguous group of pieces. In still another embodiment, blocks 311, 312 and/or 313 are subject to random variation.

At block 392 of FIG. 3C, two knob base guide points geometrically situated between two adjacent intersection guide points are selected. The two adjacent intersection guide points are, in one embodiment, two adjacent piece intersection guide points. In another embodiment, the adjacent intersection guide points are two perimeter intersection guide points. In yet another embodiment, the adjacent intersection guide point are an adjacent piece intersection guide point and a perimeter intersection guide point. The two knob base guide points delineate a base of the knob of the piece. At block 393, a knob top guide point delineating a top center of the knob is selected. At block 394, knob shape guide points geometrically situated between the two knob base guide points and the knob top guide point are selected. The knob shape guide points define a curvature of the knob. It will be appreciated that any of the blocks in FIGS. 2–3C may be repeated to create all of the pieces of a virtual jigsaw puzzle.

Figure 4:
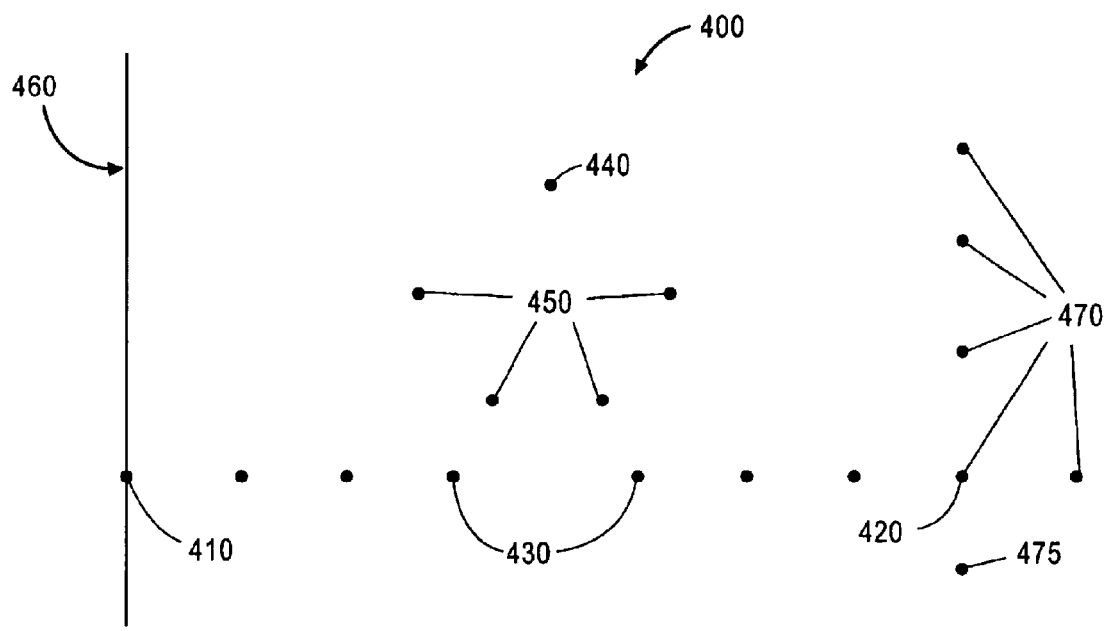
FIG. 4 is an illustration of one embodiment of performance of the methods of the present invention.
Figure 4:
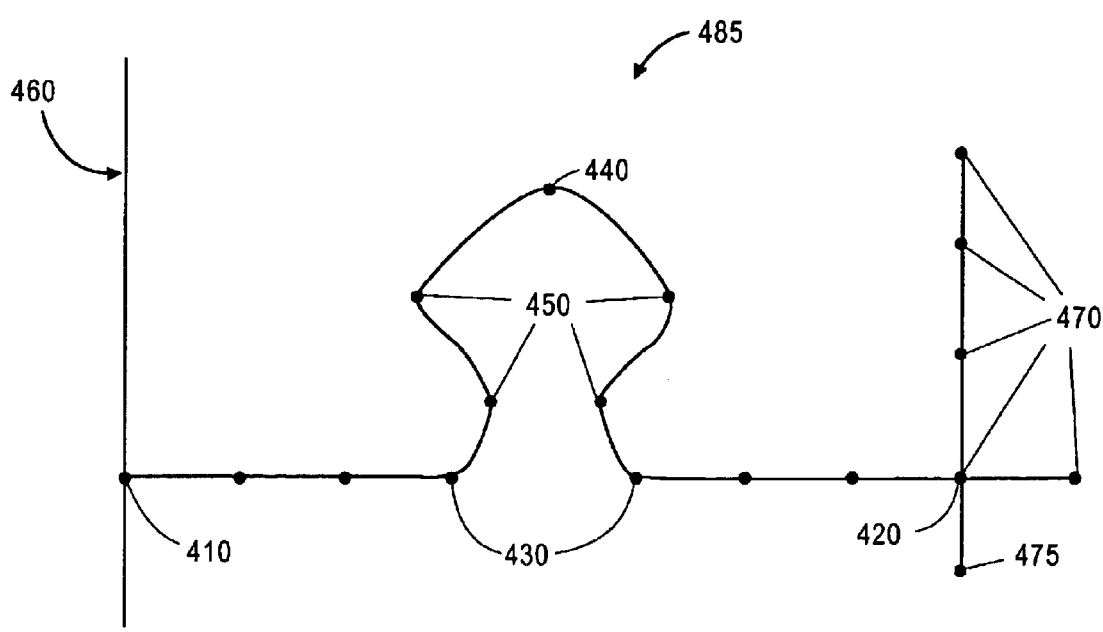

FIG. 4 is an illustration of one embodiment of performance of the methods of the present invention. Drawing 400 of FIG. 4 illustrates the selection of guide points to be used for creating a jigsaw puzzle piece. Outer perimeter 460 abuts a puzzle piece and defines an outer edge of the puzzle piece. The lower left corner of the puzzle piece intersects with edge 460 at perimeter intersection guide point 410. Knob base guide points 430 define the base of the knob. Knob top guide point 440 defines the top of the knob. Knob shape guide points 450 define the shape of the knob. Adjacent piece intersection guide point 420 is at the corner of the lower right corner of piece 400, wherein the piece abuts two adjacent pieces. Adjacent piece points 470 indicate the upper adjacent piece. Adjacent piece point 475 indicates the lower adjacent piece.

Drawing 485 of FIG. 4 illustrates the piece after the curve has been fit to the guide points.

Figure 5:
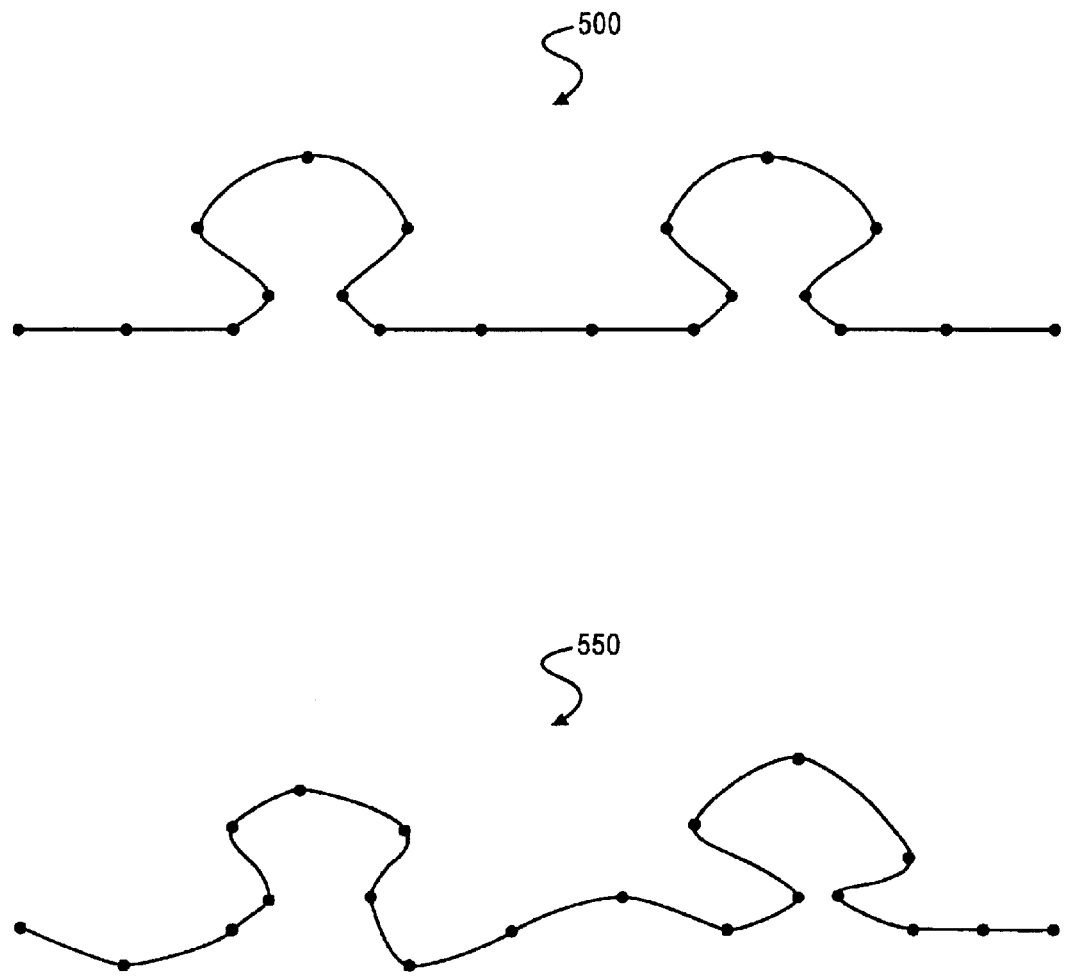
FIG. 5 is an illustration of another embodiment of the performance of the methods of the present invention.
Figure 6A:
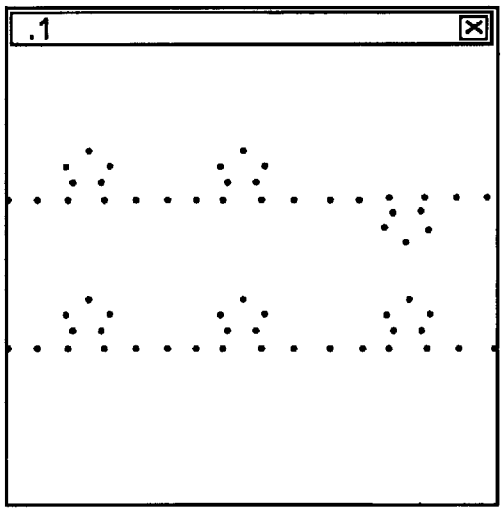
FIGS. 6A–F are illustrations of still other embodiments of the performance of the methods of the present invention.
Figure 6B:
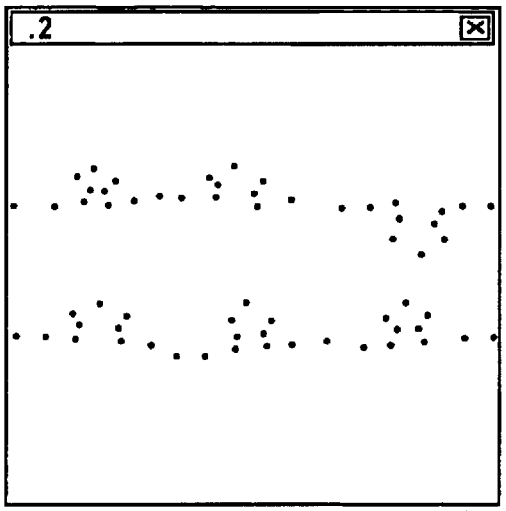
Figure 6C:
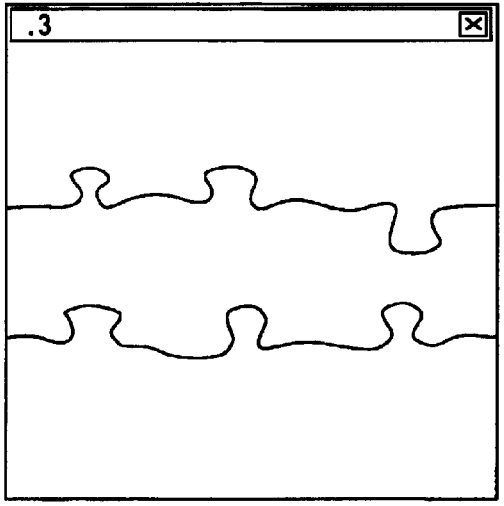
Figure 6D:
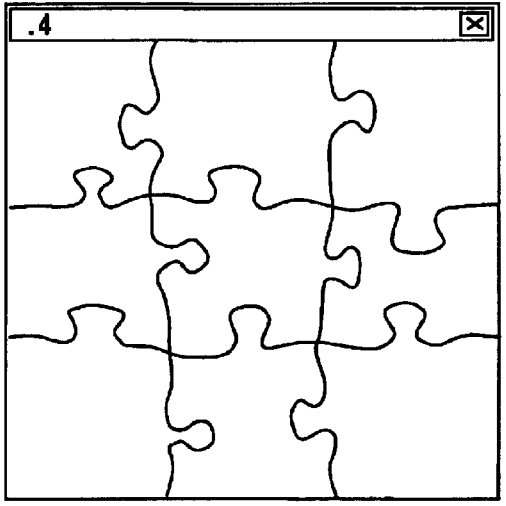
Figure 6E:
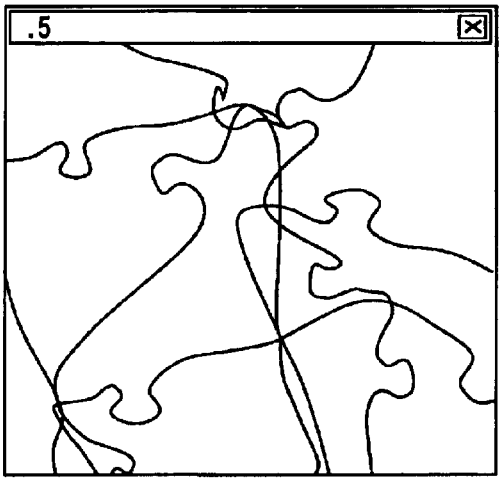
Figure 6F:
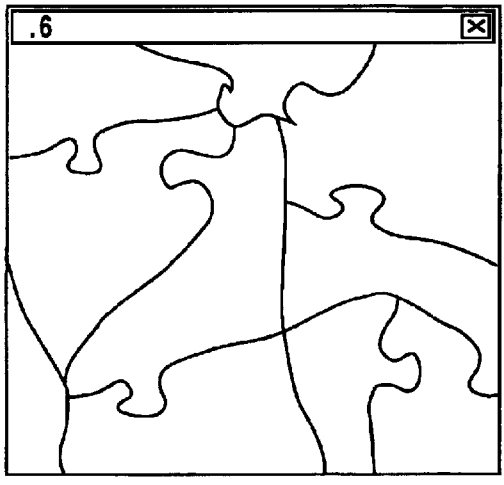

FIG. 5 is an illustration of another embodiment of the performance of the methods of the present invention. Drawing 500 of FIG. 5 illustrates a piece having two knobs. Drawing 550 of FIG. 5 illustrates the piece of drawing 500 after random perturbations have been introduced to the guide points.

FIGS. 6A–F are illustrations of still other embodiments of the performance of the present invention. Drawing 6A illustrates guide points that have been selected for two horizontal cuts of a jigsaw puzzle that have not been randomly perturbed. Drawing 6B illustrates the guide points after random perturbations have been introduced. Drawing 6C illustrates the curves that have been fit to the guide points of drawing 6B. Drawing 6D illustrates a complete cutting template. Drawing 6E illustrates an initial cut with a high degree of random perturbation. Drawing 6F illustrates a result from combining pieces of Drawing 6E where one or more of the pieces has a size below a predefined size range.

Figure 7:
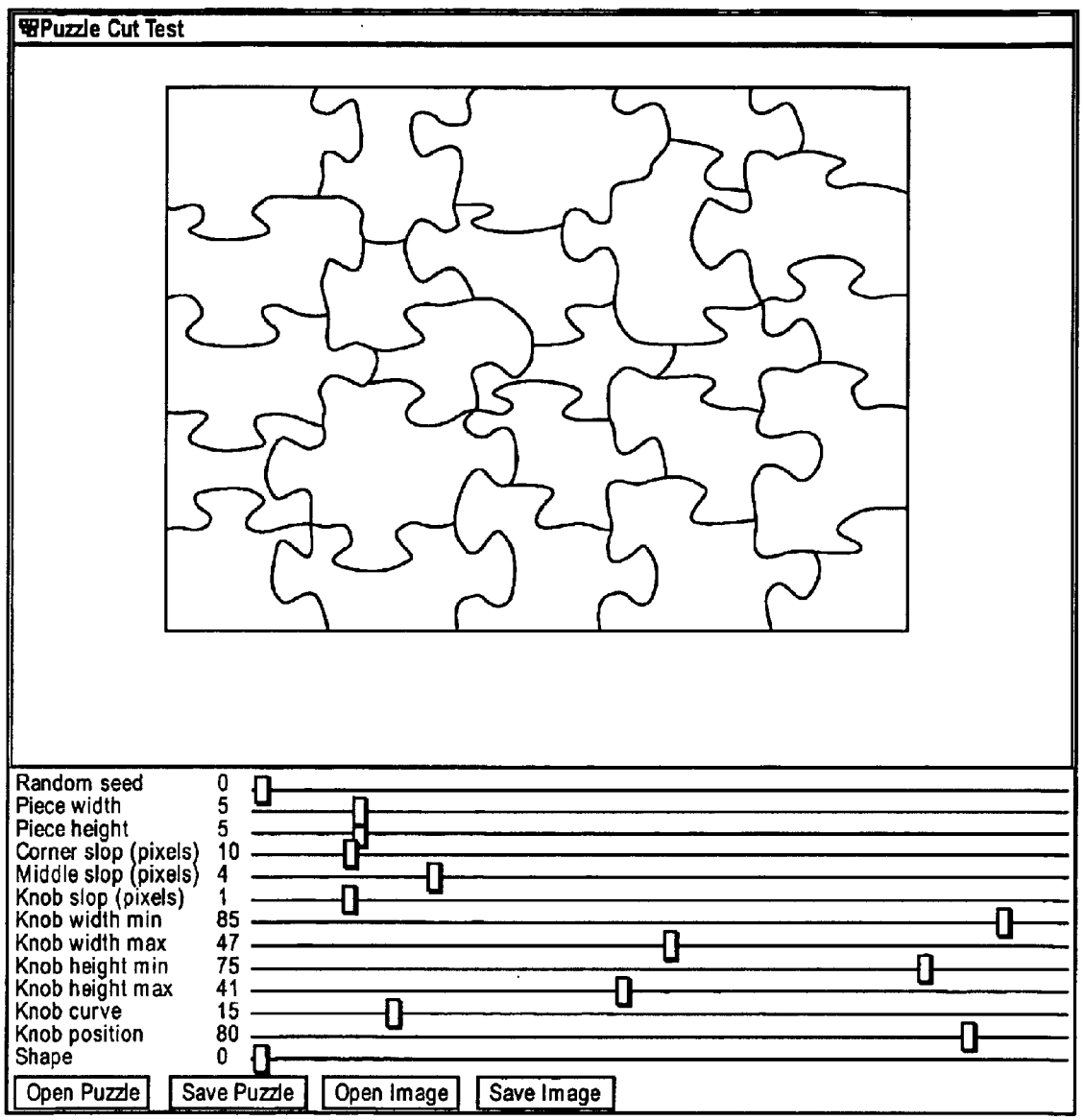
FIG. 7 is an illustration of a user interface in accordance with the methods of the present invention.

FIG. 7 is an illustration of a user interface in accordance with the methods of the present invention. In one embodiment, multiple parameters are adjusted to define a puzzle shape. Such parameters may include piece width, piece height, minimum knob width, maximum knob width, minimum knob height, maximum knob height, knob curvature, knob position, shape, or a seed for use in a random number generator to produce random perturbations.

Figure 8:
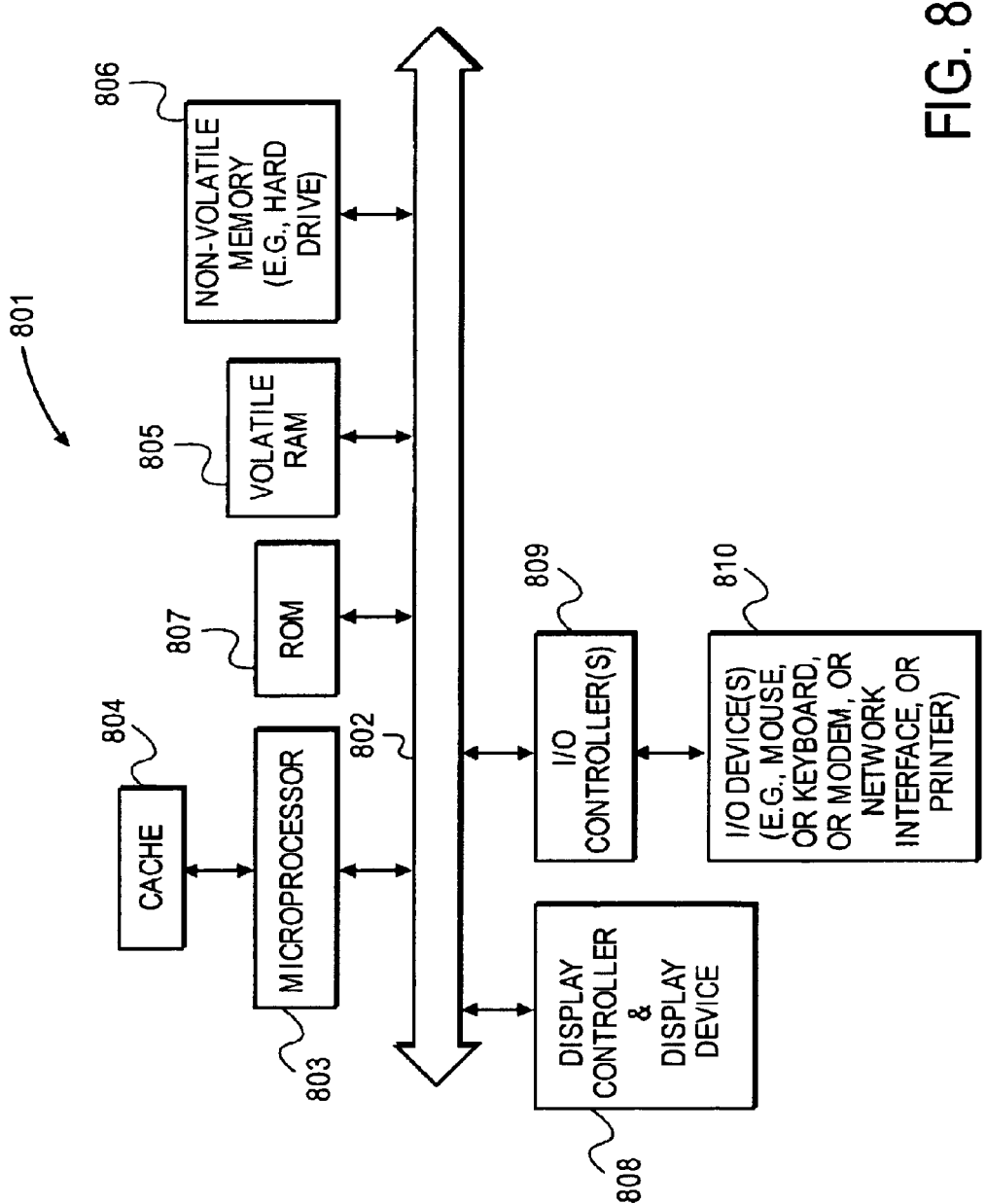
FIG. 8 is a diagram of an operating environment suitable for practicing the present invention.

FIG. 8 shows one example of a typical computer system which may be used with the present invention. Note that while FIG. 8 illustrates various components of a computer system, it is not intended to represent any particular architecture or manner of interconnecting the components as such details are not germane to the present invention.

It will also be appreciated that network computers and other data processing systems which have fewer components or perhaps more components may also be used with the present invention.

As shown in FIG. 8, the computer system 801, which is a form of a data processing system, includes a bus 802 which is coupled to a microprocessor 803 and a ROM 807 and volatile RAM 805 and a non-volatile memory 806. The microprocessor 803 is coupled to cache memory 804 as shown in the example of FIG. 8. The bus 802 interconnects these various components together and also interconnects these components 803, 804, 805, and 806 to a display controller and display device 808 and to peripheral devices such as input/output (I/O) devices which may be mice, keyboards, modems, network interfaces, printers and other devices which are well known in the art. Typically, the input/output devices 810 are coupled to the system through input/output controllers 809. The volatile RAM 805 is typically implemented as dynamic RAM (DRAM) which requires power continually in order to refresh or maintain the data in the memory. The non-volatile memory 806 is typically a magnetic hard drive or a magnetic optical drive or an optical drive or a DVD RAM or other types of memory systems which maintain data even after power is removed from the system. Typically, the non-volatile memory will also be a random access memory although this is not required. While FIG. 8 shows that the non-volatile memory 806 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 802 may include one or more buses connected to each other through various bridges, controllers and/or adapters as is well known in the art. In one embodiment the I/O controller 809 includes a USB (Universal Serial Bus) adapter for controlling USB peripherals.

It will be apparent from this description that aspects of the present invention may be embodied, at least in part, in machine-executable instructions, e.g. software. That is, the techniques may be carried out in a computer system or other data processing system in response to its processor, such as a microprocessor, executing sequences of instructions contained in a memory, such as ROM 807, volatile RAM 805, non-volatile memory 806, cache 804 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 803.

Figure 9:
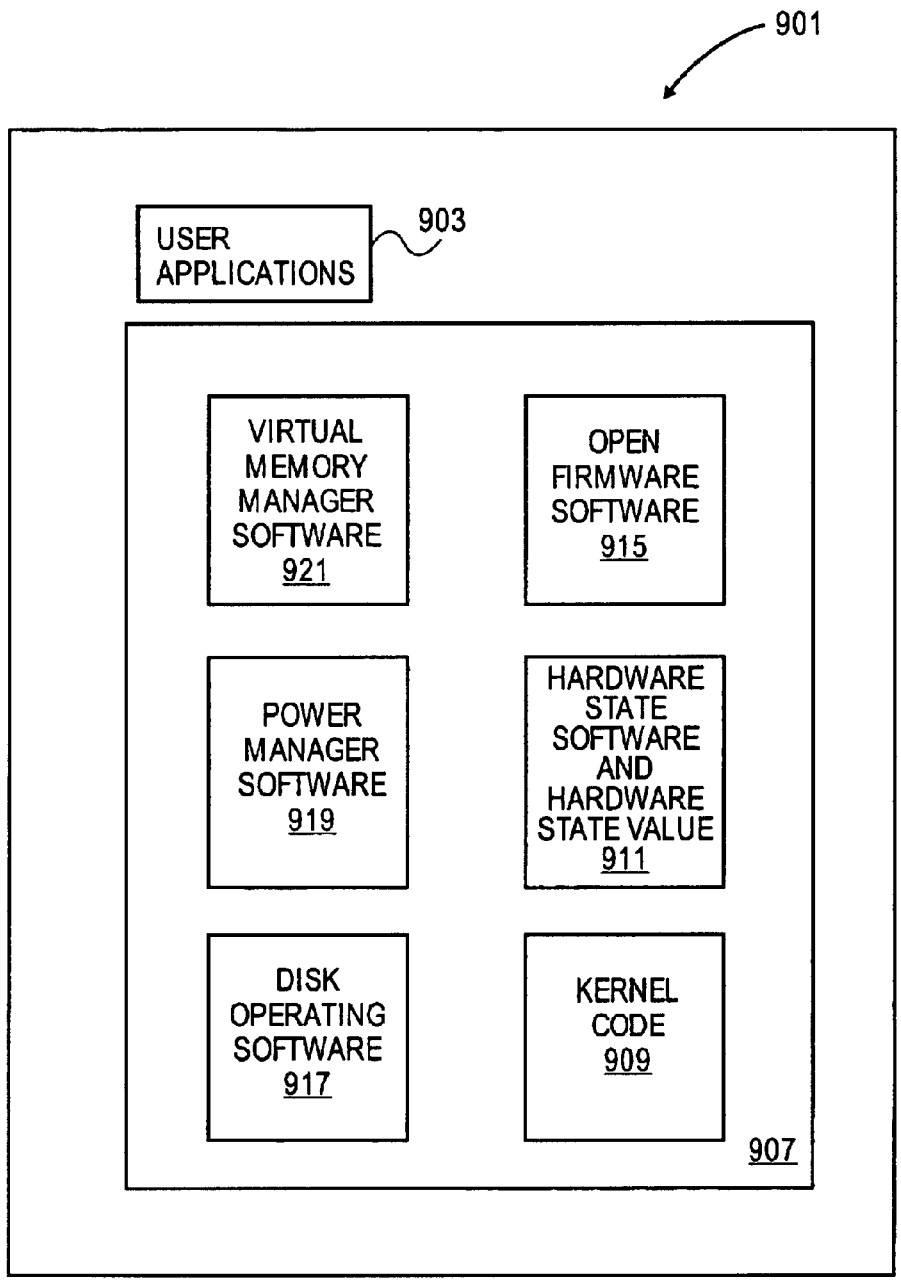
FIG. 9 is a diagram of a computer readable media, which may be used within an operating environment, such as the operating environment of FIG. 8, according to one embodiment of the present invention.

FIG. 9 shows an example of a computer readable media, which may be used with the data processing system according to one embodiment of the present invention. The computer readable media contains data and executable software which when executed in the data processing system such as a digital processing system cause the system to perform the various methods of the present invention. As noted above, this executable software and data may be stored in various places including for example the ROM 807, the volatile RAM 805, the non-volatile memory 806 and/or the cache 804. Portions of this software and/or data may be stored in any one of these storage devices. The media 901 for example may be primarily the volatile RAM 805 and the non-volatile memory 806 in one embodiment. The user applications 903 represent software applications, which are executing on the computer system, such as a word processing application or a spreadsheet application, an Internet web browser application, or the virtual puzzle creation application of the present invention. The virtual puzzle creation application has a jigsaw puzzle creating process that may be used to create cutting templates for virtual jigsaw puzzles. The operating system 907 includes the Open Firmware software 915 which may be stored in the ROM 807 and loaded into RAM 805 at boot up. The hardware state software and hardware state value 911 is the software which generates the hardware state value. The kernel code 909 represents the kernel of the operating system and performs numerous tasks. The virtual memory manager software 921 controls the virtual memory process. This typically involves maintaining a map of page data which represents the state of data in all the virtual memory which includes the physical RAM such as volatile RAM 805 and a portion of the non-volatile memory 806 which has been designated as part of the virtual memory of the system. The virtual memory manager software will be performing conventional virtual memory processes as is known in the art. The power manager software 919 performs the various power managing operations such as notifying applications and the system and drivers of changes to the power consumption state of the system. The software may also monitor the state of a computer battery to determine whether sufficient power exists to continue to operate and displays alerts to the user indicating the status of the battery and the power status of the system. The disk operating system software 917 performs the conventional functions of a disk operating system. This typically includes controlling the operation of a hard disk drive which in many examples is the non-volatile memory 806 which serves as a virtual memory for the volatile RAM 805.

In one embodiment, the virtual jigsaw puzzle creating system is comprised of a processing unit, a memory coupled to the processing unit through a bus, and a jigsaw puzzle creating process executed from the memory by the processing unit to select guide points that define geometric parameters of a piece of a jigsaw puzzle and fit a curve to the points using a spline-fitting algorithm to define a shape of the piece. In another embodiment, the system further comprises a network interface to a network coupled to the processing unit through the bus, the network interface enabling the processing unit to communicate a virtual jigsaw puzzle to a second processing unit communicatively coupled to the network through a second bus.

It will be further appreciated that the instructions represented by the blocks in FIGS. 2–3B are not required to be performed in the order illustrated, and that all the processing represented by the blocks may not be necessary to practice the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    selecting guide points that define geometric parameters of a piece of a jigsaw puzzle;
    fitting a curve to the guide points using a spline-fitting algorithm to define a shape of the piece; and
    combining the piece and an adjacent piece of the jigsaw puzzle where at least one of the group consisting of the piece and the adjacent piece is not within a predefined size range.

2. The method of claim 1, wherein the selecting and fitting are performed for a contiguous group of pieces.

3. The method of claim 1, further comprising combining the piece and an adjacent piece of the jigsaw puzzle where at least one of the group consisting of the piece and the adjacent piece is not within a predefined shape categorization.

4. The method of claim 1, further comprising drawing the curve.

5. The method of claim 4, further comprising thinning an edge that separates the piece and an adjacent piece of the jigsaw puzzle.

6. The method of claim 4, further comprising shading an edge that separates the piece and an adjacent piece of the jigsaw puzzle.

7. The method of claim 1, further comprising communicating instructions for the drawing of the curve to a cutting device, the instructions suitable for controlling the cuffing device to cut a physical jigsaw puzzle piece according to the drawing.

8. The method of claim 1, further comprising randomly varying the selecting of the guide points.

9. The method of claim 8, wherein the randomly varying is introduced by a pseudo-random number generator.

10. The method of claim 8, wherein a degree of the randomly varying is determined by a user preference.

11. A method comprising:
    selecting adjacent piece intersection guide points that define geometric locations where a corner of a piece of a jigsaw puzzle intersects with a corner of an adjacent piece of the jigsaw puzzle;
    selecting perimeter intersection guide points that define the geometric locations where a corner of the piece of the jigsaw puzzle intersects with an outer perimeter of the jigsaw puzzle if the piece is geometrically contiguous to the perimeter of the jigsaw puzzle;
    selecting knob guide points that define a geometric shape of a knob of the piece and define a size of the knob relative to the size of the piece;
    repeating the selecting of the knob guide points for every knob of the piece;
    fitting a curve to the adjacent piece intersection guide points, the perimeter intersection guide points, and the knob guide points using a spline-fitting algorithm;
    combining the piece and an adjacent piece of the jigsaw puzzle where at least one of the group consisting of the piece and the adjacent piece is not within a predefined size range; and
    drawing the curve to define a consummate shape of the piece.

12. The method of claim 11, wherein the selecting of the knob guide points further comprises:
    selecting two knob base guide points geometrically situated between two adjacent intersection guide points, the two adjacent intersection guide points selected from the group consisting of two adjacent piece intersection guide points, two perimeter intersection guide points, and an adjacent piece intersection guide point and a perimeter intersection guide point, the two knob base guide points delineating a base of the knob of the piece;
    selecting a knob top guide point delineating a top center of the knob; and
    selecting knob shape guide points geometrically situated between the two knob base guide points and the knob top guide point, the knob shape guide points defining a curvature of the knob.

13. The method of claim 11, wherein at least one of the steps from the group consisting of selecting the adjacent piece intersection guide points, selecting the perimeter intersection guide points, selecting the knob guide points, fitting the curve, and drawing the curve is performed for a contiguous group of pieces.

14. The method of claim 11, wherein at least one of the steps from the group consisting of selecting the adjacent piece intersection guide points, selecting the perimeter intersection guide points and selecting the knob guide points is subject to random variation.

15. The method of claim 14, wherein a degree of the random variation is determined by a user preference.

16. The method of claim 14, wherein the random variation is introduced by a pseudo-random number generator.

17. A machine-readable medium having stored thereon a plurality of instructions, which if executed by a machine, cause the machine to perform a method comprising:
    selecting guide points that define geometric parameters of a piece of a jigsaw puzzle;
    fitting a curve to the guide points using a spline-fitting algorithm to define a shape of the piece; and
    combining the piece and an adjacent piece of the jigsaw puzzle where at least one of the group consisting of the piece and the adjacent piece is not within a predefined size range.

18. The machine-readable medium of claim 17, wherein the method further comprises drawing the curve.

19. The machine-readable medium of claim 17, wherein the method further comprises communicating instructions for the drawing of the curve to a cuffing device, the instructions suitable for controlling the cutting device to cut a physical jigsaw puzzle piece according to the drawing.

20. The machine-readable medium of claim 17, further comprising randomly varying the selecting of the guide points.

21. The machine-readable medium of claim 17, wherein the selecting is performed for a contiguous group of pieces.

22. A system comprising:
    a client computer to receive a user preference from a user to create a virtual jigsaw puzzle defined by puzzle parameters using the user preference, the virtual jigsaw puzzle being created by a method comprising selecting guide points that define geometric parameters of a piece of a jigsaw puzzle, fitting a curve to the guide points using a spline-fitting algorithm to define a shape of the piece, and combining the piece and an adjacent piece of the jigsaw puzzle where at least one of the group consisting of the piece and the adjacent piece is not within a predefined size range;

a server communicatively coupled to the client computer to receive the puzzle parameters from the client computer; and another client computer communicatively coupled to the server to receive the puzzle parameters from the server and to create the virtual jigsaw puzzle using the puzzle parameters.

23. The system of claim 22, wherein the user preference is selected from the group consisting of:

a degree of random variation in the selecting of the guide points;

a total number of pieces of the jigsaw puzzle;

a degree of random variation of the shape of the piece;

a degree of random variation of a shape of a knob of the piece;

a size of a knob of the piece; and a minimum size of the piece.

24. The system of claim 22, wherein the selecting and fining are performed for a contiguous group of pieces.

25. A jigsaw puzzle creating system comprising:

a processing unit;

a memory coupled to the processing unit through a bus; and a jigsaw puzzle creating process executed from the memory by the processing unit to select guide points that define geometric parameters of a piece of a jigsaw puzzle and fit a curve to the guide points using a spline-fitting algorithm to define a shape of the piece, and combine the piece and a adjacent piece of the jigsaw puzzle where at least one of the group consisting of the piece and the adjacent piece is not within a predefined size range.

26. The jigsaw puzzle creating system of claim 25, further comprising a network interface to a network coupled to the processing unit through the bus, the network interface enabling the processing unit to communicate a jigsaw puzzle to a second processing unit communicatively coupled to the network through a second bus.

27. The jigsaw puzzle creating system of claim 25, wherein the jigsaw puzzle creating process adjusts creation of the jigsaw puzzle in response to a user preference input.

* * * * *

UNITED STATES PATENT AND TRADEMARK OFFICE
CERTIFICATE OF CORRECTION

PATENT NO. : 6,733,384 B2
DATED : May 11, 2004
INVENTOR(S) : Lantz

It is certified that error appears in the above-identified patent and that said Letters Patent is hereby corrected as shown below:

Column 7,
Line 38, delete "cuffing" and insert -- cutting --.

Column 8,
Line 51, delete "cuffing" and insert -- cutting --.

Signed and Sealed this

Third Day of August, 2004

JON W. DUDAS
*Acting Director of the United States Patent and Trademark Office*